Aug. 10, 1954    R. R. KILIAN    2,686,016
FISHING REEL
Filed Oct. 20, 1949    3 Sheets-Sheet 1
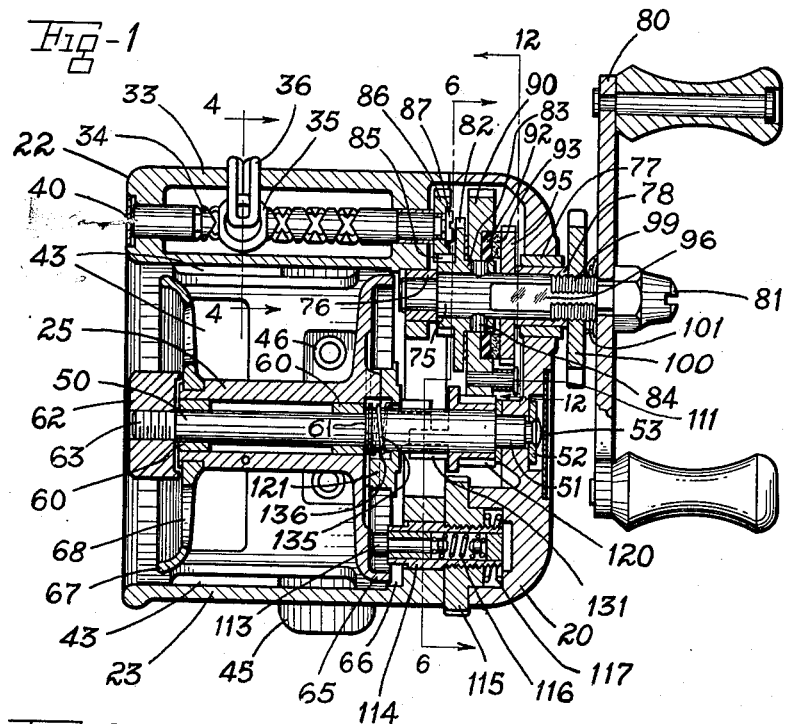
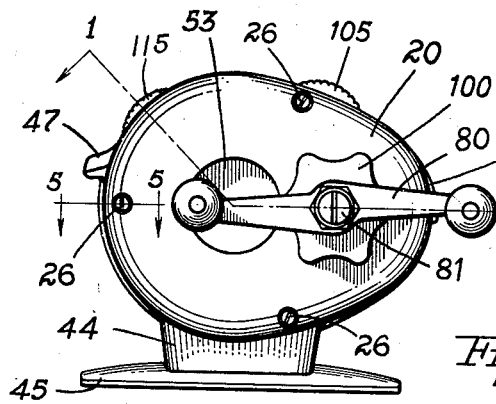
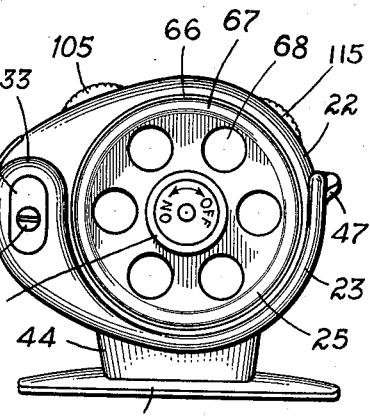
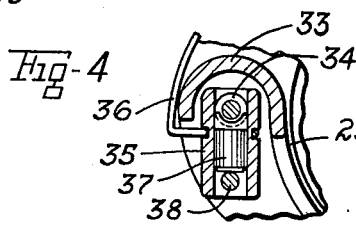
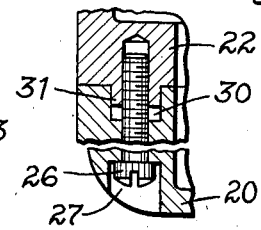
INVENTOR.
Rudolph R. Kilian
BY
Marechal & Biebel
ATTORNEYS

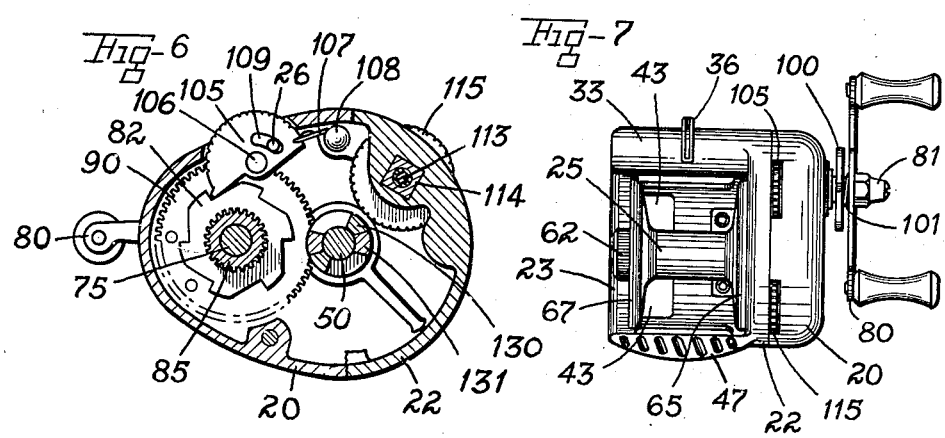
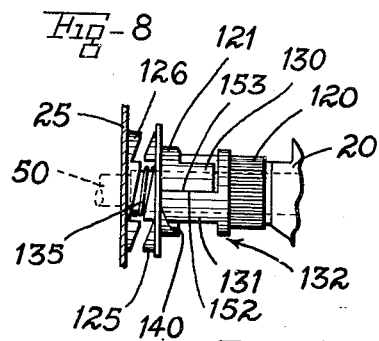
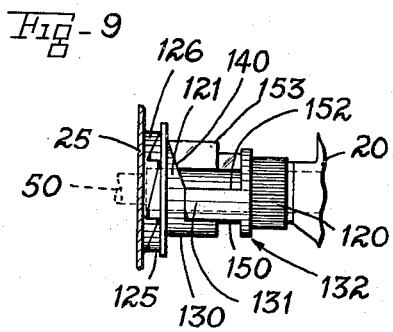
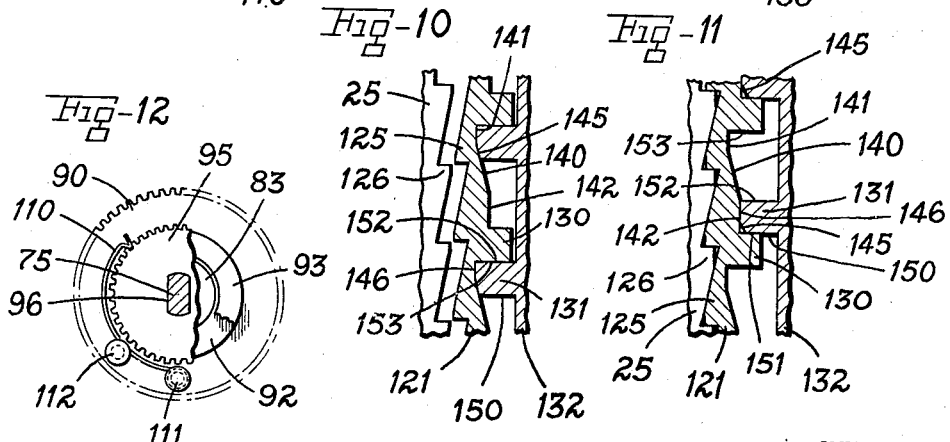

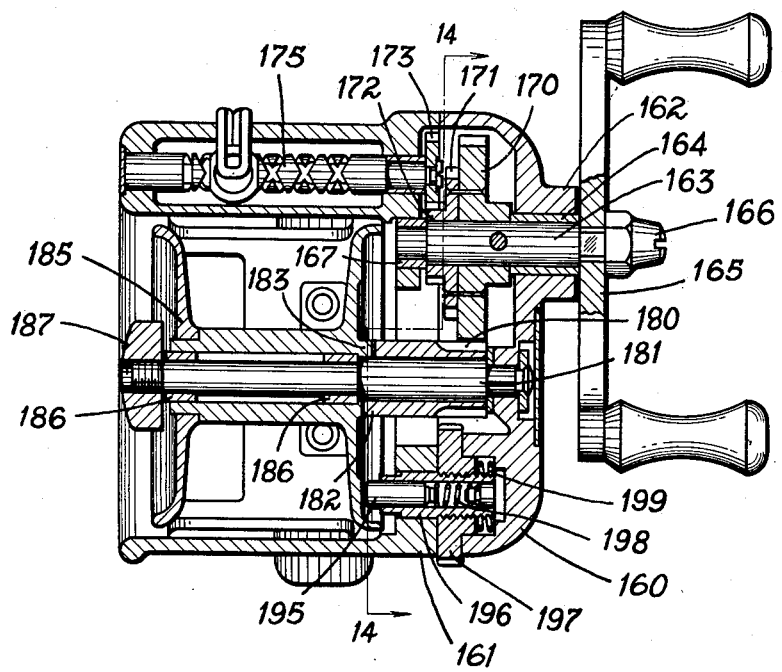
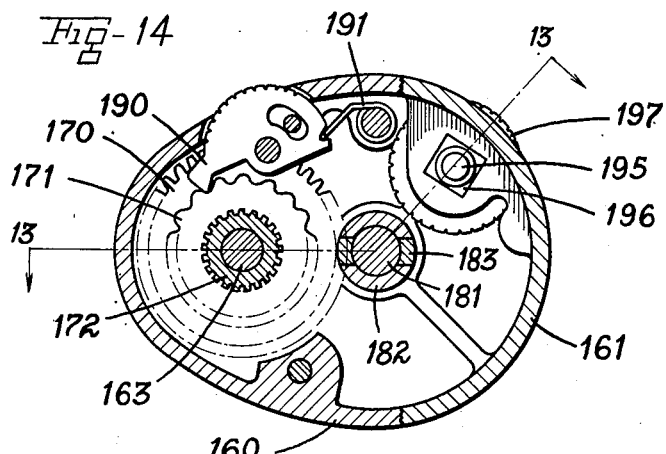

Patented Aug. 10, 1954

2,686,016

UNITED STATES PATENT OFFICE 2,686,016

FISHING REEL

Rudolph R. Kilian, Baldwinsville, N. Y.

Application October 20, 1949, Serial No. 122,390

3 Claims. (Cl. 242—84.4)

This invention relates to fishing reels.

It is desirable, in fishing, to be able to change the fishing line in accordance with the kind of fish sought, the weight and other characteristics of the lure or bait being used, the type of fishing (whether casting, trolling, still-fishing or other method), the state of the weather, and the other condition applicable. In order that the best use of time on the stream or lake or other water may be made, it should be possible to make this change quickly and easily. It is usually desirable also to keep at a minimum the weight and volume of the equipment which is carried by the angler. In actual practice, with the equipment ordinarily available, it is usually necessary for the fisherman either to forego the advantage of having different kinds and weights of lines immediately available or to carry with him several reels each containing a different weight line, an expedient which is relatively expensive and inconvenient.

In accordance with the present invention there is provided a fishing reel of the level-wind type which permits the rapid removal and replacement of line-spools by the simple removal of a single nut or other fastener at the end of the spool shaft. The spool is relatively inexpensive, and is of relatively small size, so that it is practicable for the fisherman to own and to carry on the fishing grounds a series of interchangeable spools, each wound with a fishing line of different weight.

In casting, as the spool in the reel is turned by the pull of the bait or lure and the outrunning line, the spool tends to build up a momentum which sometimes causes it to rotate faster than the line runs out, and the line to tangle and snarl in the general condition known as backlash. The invention provides a reel in which it has been made possible, without increasing the over-all dimensions, greatly to minimize the tendency to backlash by means of a spool of unusually short length and unusually large diameter which is also exceptionally light in weight, thus substantially reducing the angular velocity of rotation of the spool for any given amount of line released and decreasing its momentum, while at the same time retaining normal line-carrying capacity.

In order to eliminate the flywheel effect during casting of the weight of the spool shaft and of the various gears and pinions, the invention provides a spool rotatably mounted on a fixed shaft through strong, light bearings. The spool may be connected and disconnected with the crank by means of a semi-automatic clutch. By a short counterclockwise turn of the crank the spool may be disengaged from all of the mechanism of the reel, whereupon it rotates freely on its shaft for casting. A short turn clockwise of the crank reengages the crank with the spool through the clutch, affording a sure, strong connection for reeling-in.

The reel also has as a further safeguard against backlash a simple and sensitive brake quickly and simply adjusted by the thumb of the angler in accordance with the weight of the bait or lure and line being used.

In a conventional reel with solidly mounted side-frame bearings, when such bearings become worn-out, the reel is for practical purposes worn out also. With the invention, however, the only parts of the reel which at any time move at high velocity and are accordingly subject to any substantial degree of wear are the spool and its bearings during the act of casting. All of the other moving parts, such as the crank, gears, drive shaft, clutch, and level-wind mechanism, move only at relatively slow speed during the act of retrieving the line by the crank. The spool shaft is made of hard material and the spool bearings of relatively soft material, so that the only place of substantial wear is on the spool bearings. By reason of the design and construction and because of the relatively low cost of the interchangeable spool, the spool with its bearings may be inexpensively replaced, thus greatly increasing the life of the reel as a whole.

According to the invention, the operating mechanism of the reel may be made easily accessible for all ordinary oiling and cleaning by simply removing the nut or other fastener holding the spool in place and thus removing the interchangeable spool. During operation, however, the mechanism is fully protected from dirt, weeds, etc. by the inner end of the spool when in place.

It is one of the principal objects of the invention to provide a fishing reel having the foregoing characteristics which at the same time will be strong and long-lived and which may also be economically manufactured.

Another object is to provide a fishing reel having a level-wind mechanism and including a casing or frame which is completely open at one end and along the upper side of the spool to facilitate rapid exchange of spools and also to permit quick release of tangled turns of the line over the end of the spool in the event of backlash or other snarling of the line.

Other objects and advantages of the invention will be apparent from the following description, the accompanying drawings and the appended claims.

In the drawings—

Fig. 1 is a longitudinal sectional view on the line 1—1 of Fig. 2, showing a bait-casting reel in accordance with the invention;

Fig. 2 is an elevation of the reel as viewed from the right or crank end on a smaller scale;

Fig. 3 is an elevation of the reel as viewed from the left or open end;

Fig. 4 is a fragmentary section on the line 4—4 of Fig. 1;

Fig. 5 is an enlarged fragmentary section taken on the line 5—5 of Fig. 2;

Fig. 6 is a transverse sectional view taken on the line 6—6 of Fig. 1 on a smaller scale;

Fig. 7 is an elevational view of the reel as viewed from the top;

Fig. 8 is an enlarged fragmentary view of the clutch mechanism disengaged from the spool;

Fig. 9 is a view similar to Fig. 8 showing the clutch mechanism engaged with the spool;

Figs. 10 and 11 are enlarged developed views corresponding to Figs. 8 and 9, respectively;

Fig. 12 is a fragmentary section on the line 12—12 of Fig. 1, partly broken away to illustrate details of construction;

Fig. 13 is a longitudinal sectional view of another construction of reel taken on the line 13—13 of Fig. 14; and Fig. 14 is a transverse sectional view taken on the line 14—14 of Fig. 13.

Referring to the drawings, which illustrate preferred embodiments of the invention, the reel casing is composed of two main parts which may conveniently be formed by die-casting or the like, a housing 20 for the driving mechanism of the reel and a part 22 which includes an apron 23 for the spool 25. The two parts of the casing are shown as secured together by three screws 26 having their heads received in counterbores 27 (Fig. 5) in housing 20. In order to assure proper alignment between the two parts of the casing, at least two of the holes in housing 20 for screws 26 are counterbored at 30 (Fig. 5) to receive complementary bosses 31 which form dowels projecting from the adjacent surface of the casing part 22.

As shown in Fig. 3, the apron portion 23 of the casing part 22 is generally semi-cylindrical and underlies the line spool 25, and the forward edge of this apron is turned over at 33 to form a cover overlying the level-wind guide traversing shaft 34. The traveler 35 on shaft 34 carries the line guide 36, the traveler 35 being cylindrical and having the follower dog 37 (Fig. 4) mounted for swiveling movement therein as it rides in the grooves in shaft 34. The traveler 35 is guided and held in proper alignment by a guide rod 38 set in bores in the casing part 22 and in the outer rim of apron 23, and it will also be noted that the rod 38 serves to retain the follower 37 within traveler 35. The shaft 35 and rod 38 are retained in position in the reel by a closure plate 40 held in a suitable recess in the outer end of apron 23 by a screw 41.

The apron 23 is shown as provided with cutouts 43 for lightness, and it also includes a boss 44 which provides a convenient means of attachment to the rod plate 45 by which the reel is mounted on a fishing rod, the plate 45 being shown as riveted to boss 44 at 46. The rearward or bottom edge of apron 23 is turned over to form a flange 47 (Fig. 7) which serves as a steady rest for thumb control of the reel in casting, the upper surface of this flange being shown as provided with serrations for preventing slipping of the thumb in use.

The spool shaft 50 is supported at its right-hand end in housing 20 by a portion 51 of reduced diameter press-fitted in the housing and having its outer end riveted over a retaining washer 52, this end of the shaft being enclosed by a cover plate 53 pressed in a receiving counterbore in the outer surface of the housing. The spool 25 is rotatably mounted on shaft 50 by means of a pair of spool bearings 60, which may desirably be of a bronze oilless type and are press-fitted into the ends of the central portion of the spool. The right-hand bearing 60 abuts a shoulder or collar 61 on shaft 50, and the spool is held in place on the shaft by means of a suitable retaining nut 62 threaded on the outer end of shaft 50, preferably by means of a left-hand thread to prevent loosening during casting. The threaded end 63 of the shaft is shown as of reduced diameter to form a circumferential shoulder against which nut 62 seats to prevent binding of the spool on the shaft.

The spool includes a cup-shaped flange 65 at its right-hand end, and there is provided in the right side of casing part 22 a counterbored aperture 66 slightly larger in diameter than the diameter of flange 65. When spool 25 is in place flange 65 forms a closure for this aperture and the adjacent portions of the driving mechanism in the casing, and when spool 25 is removed by the simple device of first removing retaining nut 62, the driving mechanism is exposed for all ordinary cleaning and oiling. If the flange 65 is proportioned to extend in closely spaced relation into the counterbored portion of aperture 66, as shown in Fig. 1, a more complete closure is effected. The left flange 67 of the spool is shown as bored out at 68 for lightness.

It will be noted that with the spool shaft 50 thus held against rotation and with the spool freely rotatable thereon by means of the bearings or bushings 60, the shaft may be formed of hardened steel to minimize wear thereof, and when the bearings wear to an undesirable extent, the spool can be readily replaced without otherwise affecting operation of any of the other parts of the reel. Moreover, since the spool and bearings 60 are of simple construction, they are relatively easy to fabricate, and replacement of the spool involves little expense in comparison with the cost of the reel as a whole. This construction offers the further advantage already noted that the angler may have available several spools each wound with line of a different weight for interchangeable use in accordance with the particular fishing conditions.

It will also be noted that with the casing part 20 constructed as disclosed, the reel is free of the stay rods or like parts commonly employed to secure together the end portions of conventional fishing reels. In addition to the resulting overall lightweight and easy fabrication of the reel, this construction offers the further advantage that the spool may be constructed of a greater diameter than in the conventional reel construction without sacrificing line capacity while retaining overall dimensions of the reel approximately equal to or less than the corresponding dimensions of the majority of the commercially available reels. Not only does this increase the spool diameter by making possible substantial shortening of the spool length as compared with conventional spools of the same line capacity, with resulting decrease in the weight of the spool, but it also provides a corresponding decrease of the initial spool velocity in casting, and these two factors combine to effect material decrease of the tendency of the spool to overrun and create backlash.

The drive mechanism for the reel includes a shaft 75 having its left-hand end of reduced diameter journaled in a bushing 76 press-fitted in a web portion of casing part 22. The right-hand end of shaft 75 extends through the wall of casing part 22 and is supported in turn by a bushing 77 press-fitted in part 22 and a sleeve 78 rotatable within bushing 77. A hand crank 80 is mounted on the outer end of shaft 75 and is held in place by a suitable nut 81. A ratchet wheel 82 includes an elongated hub 83 secured to shaft 75 by a pin 84, and the drive gear 85 for level-wind traversing shaft 34 is shown as integral with ratchet wheel 82 and meshing with the level-wind drive pinion 86 held on the adjacent end of shaft 35 by a screw 87.

The main drive gear 90 for the spool is mounted for rotation with respect of shaft 75, and an adjustable friction drive connection is provided between this gear and shaft 75. The gear 90 is rotatably mounted on the hub portion 83 of ratchet wheel 82, and it is provided on its outer surface with a counterbored recess which receives a disk 92 of a relatively compressible material, preferably an oil resistant material such as fiber, neoprene or the like. A compression washer 93 is slidably mounted on hub 83 in position to engage the ring 92, and the outer face of washer 93 engages a click wheel 95 slidably mounted on shaft 75 but held against rotation thereon by the flats 96, the center bore of the click wheel being of correspondingly non-circular shape as shown in Fig. 12.

The outer portion of shaft 75 is threaded at 99 to receive an adjusting nut 100, shown as a starwheel, which engages the outer end of sleeve 78 and may be tightened to press the inner end of this sleeve against click wheel 95 and thus to compress the ring 92 against gear 90. It will accordingly be seen that when this nut is tightened, a friction drive will be effected from shaft 75 through the click wheel 95, the washer 93 and ring 92 to the gear 90. A spring 101 located between nut 100 and crank 80 serves to hold nut 100 yieldably in adjusted position.

The shaft 75 may be locked against rotation in the direction to unwind the line by a pawl 105 (Fig. 6) which cooperates with ratchet wheel 82. This pawl is mounted on a stud 106 set in the wall of casing part 22, and it includes a knurled portion extending through a slot in housing 20 for ready operation by the thumb of the angler. Spring 107 is carried by a stud 108 set in the wall of casing part 22, and this spring engages a receiving slot in the adjacent end of pawl 105 and operates with an off-center action to hold the pawl in either engaged or disengaged relation with the ratchet wheel. The slot 109 in pawl 105 provides clearance passage for the adjacent casing screw 26.

The shaft 75 may thus be locked against release of line from the spool as desired, for example for still-fishing and trolling or occasionally while playing a heavy fish. It will be noted, however, that under these conditions or when the spool is being wound, the friction connection between shaft 75 and gear 90 may be overcome by an adequately strong pull on the line, in which event gear 90 will slip on the hub 83 of ratchet wheel 82. Since the click wheel 95 is held against rotation on shaft 75, this will result in relative rotation of gear 90 against the click wheel. When such movement occurs, the angler will receive an audible indication thereof by the action of click spring 110 (Fig. 12), which is carried at one end by a stud 111 set in gear 90 and has its other end held in yieldable engagement with the teeth of click wheel 95 by a second stud 112 also set in gear 90.

In addition to the control over the spool through the frictional connection between the gear 90 and crank 80, a separate adjustable brake is provided which includes a brake shoe 113 carried by a brake slide 114 which includes a square or otherwise non-circular portion slidably received in a complementary bore in a web portion of casing part 22 as shown in Fig. 6. The rearward or right-hand end of the slide 114 is threaded within a knurled adjusting nut 115 which extends through a slot in casing 20 for operation by the thumb of the user. A helical spring 116 serves both to retain the brake shoe within slide 114 and also to urge the brake shoe in the direction of flange 65 of the spool, and thus it will be seen that as nut 115 is rotated, slide 114 will move to the left or right to carry the brake shoe 113 into or out of contact with the spool flange 65. A spring 117 is mounted between the end of nut 115 and the housing 20 to hold the nut yieldably in adjusted position.

The driving connection from gear 90 to spool 25 includes a pinion 120 mounted for free rotation on spool shaft 50 in engagement with gear 90. A clutch member 121 is mounted for axial movement on shaft 50 between pinion 120 and the spool to provide for driving the spool to wind the line or for disconnecting the spool from the drive mechanism for free rotation on shaft 50 during casting. In addition, these parts are so constructed and arranged that shifting of the clutch member between its driving and disengaged positions with respect to the spool is accomplished automatically by a relatively short movement of crank 80.

Referring particularly to Figs. 8 to 11, the clutch member 121 is provided with clutch teeth 125, and complementary clutch teeth 126 are provided on the adjacent end portion of spool 25. At its opposite side from the teeth 125, the clutch member 121 is formed with lugs or dogs 130 which extend between complementary lug portions 131 of a cam member 132 which may be integral with the pinion 120 or otherwise fixed thereto. It will be noted that the lugs 130 and 131 are each substantially less than 90° in angular extent and thus form a lost motion driving connection between the pinion 120 and clutch member 121.

A coil spring 135 is secured at one end to clutch member 121, and its other end bears against a collar 136 on shaft 50 to bias the clutch member 121 normally to the right and thus out of the position of engagement of the clutch teeth 125 and 126. In addition, the helical portion of this spring is wound sufficiently tightly on shaft 50 to provide a slight frictional drag against rotation of clutch member 121. This drag is preferably just enough so that when pinion 120 is rotated in the direction of the clearance between adjacent faces of the lugs 130 and 131, the clutch member 121 will be held stationary until the lost motion between the lug members has been taken up.

In order to effect shifting of clutch member 121 into engagement with the spool against spring 135, the clutch member 121 is provided with beveled or spiraled cam surfaces 140 for coaction with the cams formed by the outer ends of the lugs 131 on cam member 132. Referring particularly to Figs. 10 and 11, in which the clutch member 121 and cam member 132 have been cross-hatched for increased clarity of illustration, it will be noted that these cam surfaces 140 terminate at either end in flats 141 and 142, and the end of each of the lugs similarly includes a complementary beveled portion 145 and flat 146. Figs. 9 and 11 show these parts in the engaged position of the clutch for winding the spool, and in this position it will be noted that the flats 142 and 146 are in engagement, thus forcing the cam member 121 to its limit of movement to the left to effect engagement of its teeth 125 with the teeth 126 on the spool. Also, in this position of the parts the surface 150 of each lug 131 is in abutting relation with the adjacent surface 151 of each lug 139, with the result that if pinion 120 is rotated in clockwise direction as viewed in Fig. 6, the spool 25 will be driven in the direction to wind the line.

Figs. 8 and 10 show the relative positions of these parts when the spool is disengaged from the drive mechanism for free wheeling on shaft 50. In shifting to this relative position from the position shown in Figs. 9 and 11, the pinion 120 rotates with respect to clutch member 121 to the angular extent permitted by the space between the surface 152 of lug 131 and the surface 153 of lug 139, the clutch member 121 being held stationary on shaft 50 during this lost motion rotation of the pinion by the frictional grip of spring 135 on the shaft. During this relative rotation between the pinion and cam member 121, the cam surfaces 145 slide along the beveled cam surfaces 140 until the flats 146 seat on flats 141, with the surfaces 152 and 153 being then in abutting relation. Since the axial spacing between the flats 141 and 142 is slightly greater than the corresponding dimension of the clutch teeth 125 and 126, the clutch member 121 will thus be urged to its position of disengagement by spring 135.

It will accordingly be seen that the shifting of clutch member 121 in either direction is automatically effected by a relatively slight angular movement of crank 80, this angular movement being the amount necessary to take up the lost motion between pinion 120 and clutch member 121. If the clutch member is in the freewheeling position shown in Figs. 8 and 10 it will be shifted into the driving position by the slight movement of the crank in the direction to wind the line, thus automatically engaging the spool for winding as soon as the crank is moved in the proper direction to wind. Conversely, shifting of the clutch to its freewheeling position is accomplished by the same angular movement of the crank in the reverse direction. It will also be noted that since in either position of the clutch member 121, there is seated engagement of the flats 146 on either the flats 141 or 142, the clutch member will remain in position until it is shifted as a result of relative rotation between it and the pinion 120.

In use for bait casting, the spool is released for freewheeling casting by the slight reverse rotation of the crank as described. As a result, during casting the only moving part is the spool itself, and its momentum is comparatively slight due to its relatively light weight, its short length, and its correspondingly increased diameter and reduced angular speed. The tendency of the spool to overrun and thus cause backlash is accordingly clearly reduced, and further control of the spool is readily obtained as desired by adjustment of the brake nut 115, the spring loaded arrangement of brake shoe 113 providing a highly sensitive and stable adjustment for balancing the freedom of rotation of the spool and the weight of the bait or lure. If, however, backlash or other snarling of the line should occur, resulting tangled turns of line can be quickly and easily slipped off the open end of the spool for rapid untangling and rewinding. It will also be noted that as a result of the shortened axial length of the spool, there is relatively slight angular deflection of the line in passing through the levelwind guide 36 when the latter is stationary, and accordingly guide 36 may remain stationary during casting and offers no obstruction to a free running line.

When it is desired to retrieve the line at the end of the cast, the first few degrees turn of crank 80 in the direction to wind accomplishes shifting of the clutch member 121 as described into driving engagement with the spool, and thereafter the spool is driven through the gears 90 and 120. During this operation, adjustment of the star nut 100 as described determines the extent of the frictional connection between shaft 80 and gear 90, thus providing the slippage required to guard against accidental breaking of the line in the event of a sudden pull on the line as when a fish strikes the hook or especially when trolling if the hook is snagged on a weed or the like.

It will accordingly be seen that the present invention provides a reel having distinct advantages from the standpoint of lightness and simplicity in manufacture and highly desirable operating characteristics for many fishing purposes. The arrangement for quick interchange of spools is simple in operation, and the spools themselves are sufficiently small and light to make it convenient and practical for the angler to carry with him several spools holding lines of different weight. Furthermore, since the spool and its bearings are the only parts of the reel which travel at high speed in use, and since they are the only parts thus subject to extensive wear, they can be quickly and comparatively inexpensively replaced without affecting the other parts of the reel. It will also be noted that in operation all of the adjusting members of the reel are located for convenient operation by the thumb of the angler, and may be carried out while the reel is in use.

A further advantage of this construction is the ease of cleaning, oiling or otherwise servicing the driving mechanism. All of the drive parts are exposed for cleaning and oiling upon simple removal of the spool and without disassembling any other part of the reel. On the other hand, if it should be necessary to replace any of the driving parts, this can also be done quickly and easily by releasing the casing bolts 26 and separating the housing 20 from the casing part 22, thereby exposing all of the gears and associated parts for quick removal and replacement.

Figs. 13 and 14 show a reel having a readily replaceable line spool as described in connection with Figs. 1–12, but this reel is provided with a fixed gear drive and does not include the free wheeling and star drag arrangement as shown in Figs. 1–12. The housing 160 and casing part 161 are shown as substantially identical with parts 20 and 22 as described, with the exception that the housing 160 includes a cylindrical boss 162 for supporting the crank shaft 163 and bearing 164. This shaft 163 carries the usual crank 165 and retaining nut 166 at its outer end, and its inner end is journaled in bushing 167 press-fitted in the adjacent web portion of the casing part 161.

The main gear 170 is pinned to shaft 163, and a click wheel 171 is in turn pinned to gear 170 and includes a gear portion 172 meshing with the pinion 173 on the right-hand end of the level-wind traversing shaft 175, the remainder of the level-wind mechanism being shown as the same construction described in connection with Figs. 1–4. The gear 170 meshes with a drive pinion 180 mounted for free rotation on the spool shaft 181, which has its right-hand end supported in housing 160 in the same manner as described in connection with Fig. 1. The pinion 181 includes a relatively long hub portion having lugs 182 at its outer end which engage complementary lug portions 183 on the line spool 185 to form a positive driving connection between the spool and the pinion. The spool 185 is freely mounted on shaft 181 by bushings or bearings 186 and is held in driving engagement with the pinion by the retaining nut 187.

A pawl 190 cooperates with click wheel 171 to give an audible signal when shaft 163 rotates, the pawl being provided with an off-center action spring 191 as shown in Fig. 14 to hold it in either engaged or disengaged position. In addition, a brake is provided for the spool which comprises a brake shoe 195 carried by a slide 196 similar to slide 114 and similarly threaded within a knurled adjusting nut 197, the brake also including springs 198 and 199 similar to the springs 116 and 117 already described in connection with Fig. 1.

It will thus be seen that with the construction shown in Figs. 13 and 14 the spool 185 can be readily exchanged by simply removing the nut 187, withdrawing the spool, and replacing it with another spool having the proper lugs 183 for engagement with the lugs 182 on pinion 181. This reel thus provides the same feature of ready interchange of reels already discussed in Figs. 1 to 12, as well as ready access to the spool for removal of tangled turns of the line in the event of backlash or other snarling of the line. It will also be noted that with the casing part 161 constructed as shown with an opening for receiving the right-hand end flange of the spool, ready access to the drive mechanism for cleaning or oiling is provided when the spool is removed without requiring removal or opening of any of the other parts. In addition, if any of the drive parts require replacing, this may also be conveniently done by separating the housing 160 and casing part 161, which will expose all of the parts of the drive for convenient servicing or replacement.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a fishing reel of the character described adapted for use with a plurality of interchangeable line spools and having a level wind mechanism including a traversing shaft, the combination of a casing including an end portion forming a housing and a second portion extending from said housing and forming an apron open along one side thereof and at the end thereof opposite said housing, said apron including an outer end portion cooperating with an opposite portion of said housing to support said traversing shaft, said apron also including a hollow portion within the forward edge thereof forming a cover for said traversing shaft, drive means in said housing, a shaft mounted at one end in said housing with the other end extending outwardly in the direction of said open end of said apron, a spool adapted to be received on said shaft for rotation with respect thereto, means forming driving connections from said drive means to said spool and to said level wind mechanism, and removeable means for retaining said spool on said shaft to provide for ready removal and replacement of said spool without affecting the other parts of said reel.

2. In a fishing reel of the character described adapted for use with a plurality of interchangeable line spools and having a level wind mechanism including a traversing shaft, the combination of a casing including an end portion forming a housing and a second portion extending from said housing and forming an apron open along one side thereof and at the end thereof opposite said housing, said apron including an outer end portion cooperating with an opposite portion to support said traversing shaft, said apron also including a hollow portion within the forward edge thereof forming a cover for said traversing shaft, drive means in said housing, a shaft mounted at one end in said housing and extending outwardly therefrom in the direction of said open end of said apron, a spool adapted to be received on said shaft for rotation with respect thereto, means forming driving connections from said drive means to said spool and to said level wind mechanism, and removable means for retaining said spool on said shaft to provide for ready removal and replacement of said spool without affecting the other parts of said reel, said housing having an opening therein opposite the adjacent end of said spool, and means forming a closure for said opening removable upon removal of said spool from said shaft to provide ready access to said drive means and to said driving connection to said level wind mechanism.

3. A fishing reel for fastening to a fishing rod and adapted for ready interchangeability of line spools comprising a casing having a drive means housing, a shaft mounted at one end in said housing and extending transversely of said rod, removable spool retaining means on said shaft at the end thereof opposite said housing, a spool adapted to be slipped on and off said shaft when said spool retaining means is removed therefrom, a level wind mechanism, drive means in said housing, means forming a driving connection between said drive means and said spool, means forming a driving connection between said drive means and said level wind mechanism, and a substantially semi-cylindrical protective apron extending from said housing under the bottom portion of said spool, the top portion of said spool and the end opposite said housing being open, said apron including at its forward edge a protective enclosure for said level wind mechanism and at its rearward edge a thumb rest.

(References on following page)

References Cited in the file of this patent

UNITED STATES PATENTS

| Number | Name | Date |
|---|---|---|
| 479,192 | Leedle | July 19, 1892 |
| 715,274 | Konigsberg | Dec. 9, 1902 |
| 878,177 | Anderson | Feb. 4, 1908 |
| 890,892 | Douglass | June 16, 1908 |
| 1,421,839 | Schmid | July 4, 1922 |
| 1,849,212 | Winther | Mar. 15, 1932 |
| 1,901,091 | Fawcett | Mar. 14, 1933 |
| 2,120,190 | Rickards et al. | June 7, 1938 |
| 2,154,122 | Brenneman | Apr. 11, 1939 |
| 2,458,298 | Polevoy | Jan. 4, 1949 |
| 2,484,546 | Berlinger | Oct. 11, 1949 |
| 2,518,903 | King | Aug. 15, 1950 |

FOREIGN PATENTS

| Number | Country | Date |
|---|---|---|
| 150,443 | Great Britain | Sept. 6, 1920 |
| 385,769 | Great Britain | Jan. 5, 1933 |
| 734,278 | France | July 26, 1932 |
| 813,087 | France | Feb. 15, 1937 |